United States Patent
Gough et al.

(10) Patent No.: US 9,354,679 B2
(45) Date of Patent: May 31, 2016

(54) SYSTEM AND METHOD FOR CAUSING REDUCED POWER CONSUMPTION ASSOCIATED WITH THERMAL REMEDIATION

(71) Applicant: Intel Corporation, Santa Clara, CA (US)

(72) Inventors: Robert Gough, Sherwood, OR (US);
Barnes Cooper, Tigard, OR (US);
Basavaraj Astekar, Hillsboro, OR (US);
Mazen Gedeon, Hillsboro, OR (US);
Soethiha Soe, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 529 days.

(21) Appl. No.: 13/730,386

(22) Filed: Dec. 28, 2012

(65) Prior Publication Data

US 2014/0189390 A1 Jul. 3, 2014

(51) Int. Cl.
*G06F 1/32* (2006.01)
*G06F 1/20* (2006.01)

(52) U.S. Cl.
CPC .............. *G06F 1/206* (2013.01); *G06F 1/3206* (2013.01); *G06F 1/3243* (2013.01); *Y02B 60/1239* (2013.01); *Y02B 60/1275* (2013.01)

(58) Field of Classification Search
CPC ..... G06F 1/206; G06F 1/3206; G06F 1/3243; G06F 60/1275; Y02B 60/1239
See application file for complete search history.

(56) References Cited

U.S. PATENT DOCUMENTS

| | | | | |
|---|---|---|---|---|
| 5,513,361 | A * | 4/1996 | Young | G06F 1/325 713/320 |
| 5,848,282 | A * | 12/1998 | Kang | G06F 1/206 361/695 |
| 5,955,793 | A * | 9/1999 | Khadkikar et al. | 307/117 |
| 6,259,172 | B1 * | 7/2001 | Lee | G06F 1/206 307/116 |
| 6,415,388 | B1 * | 7/2002 | Browning et al. | 713/322 |
| 6,470,289 | B1 | 10/2002 | Peters et al. | |
| 6,509,911 | B1 * | 1/2003 | Shimotono | 715/761 |
| 6,717,530 | B1 * | 4/2004 | Schmidt et al. | 340/870.17 |

(Continued)

FOREIGN PATENT DOCUMENTS

| | | |
|---|---|---|
| KR | 10-2009-0112645 | 10/2009 |
| TW | 200617662 | 6/2006 |

(Continued)

OTHER PUBLICATIONS

PCT International Search Report and Written Opinion received in PCT International Patent Application No. PCT/US2013/048278, mailed on Oct. 17, 2013.

(Continued)

*Primary Examiner* — M Elamin
*Assistant Examiner* — Abdelmoniem Elamin
(74) *Attorney, Agent, or Firm* — Patent Capital Group

(57) ABSTRACT

Particular embodiments described herein can offer a method that includes receiving a signal indicating whether at least one device is in a low power mode, determining that the at least one device is in a first thermally benign state based, at least in part, on the signal, and performing a first operation associated with a reduced thermal remediation power consumption.

30 Claims, 7 Drawing Sheets

(56) References Cited

U.S. PATENT DOCUMENTS

| | | | |
|---|---|---|---|
| 6,873,883 B2* | 3/2005 | Ziarnik | 700/300 |
| 8,031,454 B2* | 10/2011 | Muraki | G06F 1/206 361/103 |
| 8,304,698 B1* | 11/2012 | Tischler | 219/497 |
| 8,308,359 B2* | 11/2012 | Walker | 374/176 |
| 8,489,250 B2* | 7/2013 | Aklilu et al. | 700/300 |
| 8,497,453 B2* | 7/2013 | Walker | 219/502 |
| 2003/0120394 A1 | 6/2003 | Ziarnik | |
| 2007/0162582 A1* | 7/2007 | Belali et al. | 709/223 |
| 2007/0226522 A1 | 9/2007 | Aleksic et al. | |
| 2007/0241203 A1* | 10/2007 | Wagner et al. | 236/1 C |
| 2008/0256345 A1 | 10/2008 | Bose et al. | |
| 2009/0102850 A1 | 4/2009 | Liang et al. | |
| 2010/0285828 A1 | 11/2010 | Panian et al. | |
| 2011/0291807 A1* | 12/2011 | Law et al. | 340/10.1 |
| 2012/0096288 A1* | 4/2012 | Bates | G06F 1/206 713/320 |
| 2014/0189408 A1 | 7/2014 | Gough et al. | |

FOREIGN PATENT DOCUMENTS

| | | |
|---|---|---|
| TW | 200941206 | 10/2009 |
| TW | 201033802 | 9/2010 |
| TW | I348641 | 9/2011 |
| TW | I374356 | 10/2012 |
| WO | WO 2006/019837 | 2/2006 |
| WO | WO 2010/042108 | 4/2010 |
| WO | WO 2014/105192 | 7/2014 |

OTHER PUBLICATIONS

Taiwan Patent Office Action and Search Report in Taiwan Patent Application Serial No. 102145925 mailed on Jul. 29, 2015.

PCT International Preliminary Report on Patentability in PCT International Application Serial No. PCT/US2013/048278 mailed on Jul. 9, 2015.

Notice of the First Office Action issued Nov. 24, 2015 by the State of Intellectual Property Office of the People's Republic of China for Application No. 201380004561.2 [English Translation].

* cited by examiner

SYSTEM AND METHOD FOR CAUSING REDUCED POWER CONSUMPTION ASSOCIATED WITH THERMAL REMEDIATION

TECHNICAL FIELD

Embodiments described herein generally relate to providing for power savings in a processor environment.

BACKGROUND

As electronic apparatuses become more complex and ubiquitous in the everyday lives of users, more and more diverse requirements are placed upon them. For example, many electronic apparatuses can operate on battery power, thus allowing users to operate these devices in many different circumstances. In addition, as capabilities of electronic apparatuses become more extensive, many users may become reliant on the enhanced performance such capabilities provide. As these aspects of electronic apparatuses have evolved, there has become an increasing need for reducing power consumption. However, as capabilities of electronic apparatuses has increased, the amount of heat generated by electronic apparatuses has increased as well. Many electronic apparatuses contain mechanisms for thermal remediation of this generated heat. It may be desirable to control the thermal remediation in a way that reduces power consumption while still allowing for thermal remediation to occur.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to providing a power savings in a processor environment. Features such as structure(s), function(s), and/or characteristic(s), for example, are described with reference to one embodiment as a matter of convenience; various embodiments may be implemented with any suitable one or more of the described features.

In at least one embodiment, a method is provided and includes receiving a signal indicating whether at least one device is in a low power mode; determining that the at least one device is in a first thermally benign state based, at least in part, on the signal; and performing a first operation associated with a reduced thermal remediation power consumption. In more specific embodiments, the at least one device comprises at least one of a processor or a controller hub. Additionally, determining that the at least one device is in a first thermally benign state comprises determining that a low power duty cycle of the signal exceeds a threshold duty cycle. The first operation can relate to reducing power consumption associated with at least one of: a software module associated with monitoring thermal sensor information, a thermal sensor, or a cooling device. The first operation can also relate to reducing a sampling frequency associated with a thermal sensor. The method could also include receiving thermal sensor information; and determining that the thermal sensor information indicates a temperature within a predetermined temperature threshold.

Figure 1:
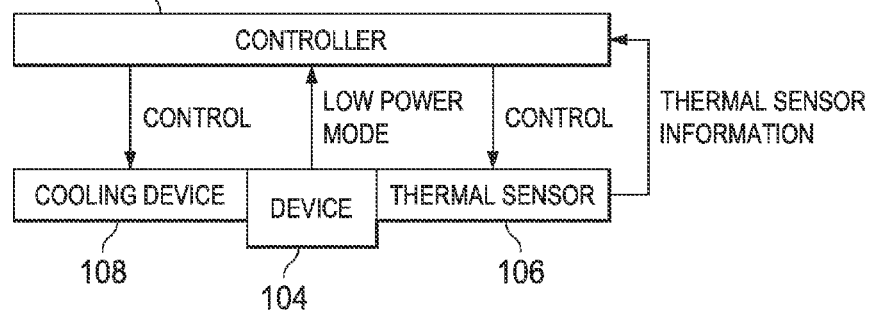
FIG. 1 is a block diagram illustrating components associated with thermal remediation of a device according to at least one example embodiment.
Figure 2:
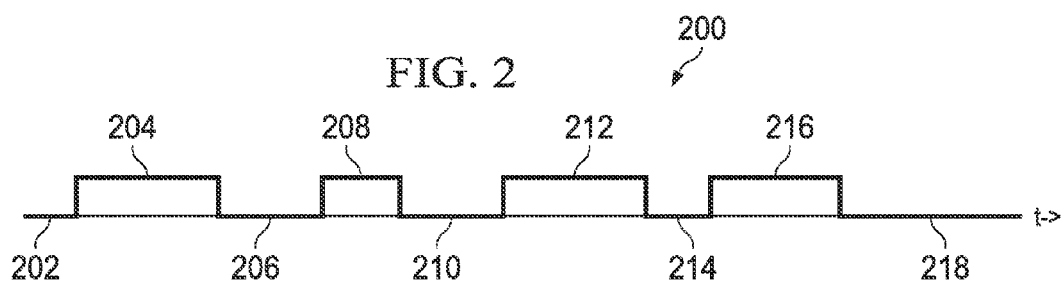
FIG. 2 is a timing diagram illustrating a signal that indicates whether at least one device is in a low power mode according to at least one example embodiment.

FIG. 1 is a block diagram illustrating components associated with thermal remediation of a device 104 according to at least one example embodiment. The example of FIG. 2 is merely an example of components associated with thermal remediation of a device, and does not limit the scope of the claims. For example, operations attributed to a component may vary, number of components may vary, composition of a component may vary, and/or the like. For example, in some example embodiments, operations attributable to one component of the example of FIG. 1 may be allocated to one or more other components.

The example of FIG. 1 illustrates controller 102 in communication with device 104, thermal sensor 106, and cooling device 108. Controller 102 may be any type of controller, such as power management controller 1118 of FIG. 10, power control 1055 of FIG. 9, and/or the like. In at least one example embodiment, controller 102 is an embedded controller, a thermal system management controller (SMC), and/or the like. Device 104 may be any type of electronic device. In at least one example embodiment, device 104 is a processor, such as processor 1104 of FIG. 10, a controller, such as display controller 1112 of FIG. 10, a storage system, such as storage system 1108 of FIG. 10, a platform controller hub (PCH), an input/output controller hub (ICH), and/or the like. In at least one example embodiment, device 104 is a system on a chip, such as ARM ecosystem SOC 1000 of FIG. 9. Thermal sensor 106 may be any type of sensor capable of providing thermal sensor information, such as temperature information. In at least one example embodiment, thermal sensor 106 is associated with device 104. For example, thermal sensor 106 may be thermally coupled with device 104 such that thermal sensor 106 may provide thermal sensor information that indicates the temperature of device 104. Cooling device 108 may be any cooling device that is capable of causing a reduction in temperature. In at least one example embodiment, cooling device 108 is associated with device 104. For example, cooling device 108 may be coupled with device 104 such that cooling device 108 may cause temperature reduction of device 104. For example, cooling device may comprise a fan, a liquid cooling element, and/or the like. Cooling device 108 may be thermally coupled to device 104.

In at least one example embodiment, thermal sensor 106 and cooling device 108 are associated with thermal remediation. For example, controller 102 may monitor thermal information received from thermal sensor 106 to determine whether device 104 is at a desired temperature. Controller 102 may control operation of cooling device 108 to reduce temperature of device 104, based, at least in part, on the received thermal information from thermal sensor 106. For example, controller 102 may enable cooling device 108 if controller 102 determines that the temperature indicated by thermal sensor information is beyond a threshold value. Therefore, control, use, and/or operation of cooling device 108 and thermal sensor 106 may be referred to as thermal remediation.

Even though the example of FIG. 1 shows a single controller, a single device 104, a single thermal sensor 106, and a single cooling device 108, there may be multiple controllers, devices, thermal sensors, and/or cooling devices. Furthermore, a controller may be in communication with one or more devices. In addition, a thermal sensor may be associated with one or more devices. Moreover, a cooling device may be associated with one or more devices.

In at least one example embodiment, controller 102 controls thermal sensor 106 and receives thermal sensor information from thermal sensor 106. For example, controller 102 may comprise one or more software modules associated with controlling thermal sensor 106 and/or receiving thermal sensor information from thermal sensor 106. Controller 102 may sample thermal sensor information from thermal sensor 106 at various points in time. For example, controller 102 may sample thermal sensor information periodically. The frequency of which controller 102 samples thermal sensor information from thermal sensor 106 may be referred to as a sampling frequency. Controller 102 may control the power that is used to enable operation of thermal sensor 106. For example, controller 102 may control provision of power to thermal sensor 106 to enable provision of thermal sensor information at a sampling time, but control non-provision of power to thermal sensor 106 at a non-sampling time.

It should be understood that there may be power consumption associated with controller 102 sampling thermal information from thermal sensor 106. For example, there may be power consumption associated with the operation of software modules, for example software modules within controller 102, associated with sampling thermal sensor information from thermal sensor 106. In another example, there may be power consumption associated with sampling thermal information from thermal sensor 106, for example in performing signal conversion. In still another example, there may be power consumption associated with enabling the receiving of thermal information from thermal sensor 106 may consume power by way of providing power to the thermal sensor.

In at least one example embodiment, controller 102 controls cooling device 108. For example, controller 102 may enable and/or disable cooling device 108, may control amount of cooling applied by cooling device 108, and/or the like. In at least one example embodiment, cooling device 108 may be controllable such that cooling device 108 may vary the amount of cooling performed. For example, if cooling device 108 comprises a fan, the fan speed may be varied to vary the amount of cooling. In another example, if cooling device 108 comprises a liquid cooling element, circulation of the liquid may be varied to vary the amount of cooling. It should be understood that there may be power consumption associated with operation of cooling device 108. For example, there may be power consumption associated with the operation of software modules, for example software modules within controller 102, associated with enabling operation of cooling device 108. In another example, there may be power consumption associated with operation of cooling device 108, such as power for rotating a fan, power for circulating a liquid, and/or the like. In at least one example embodiment, controller 102 operates independently from operating system software. For example, controller 102 may operate by way of firmware, a device driver, motherboard logic, and/or the like. In such circumstances, controller 102 may perform operations exclusive from the operating system software.

In an example embodiment, device 104 may provide a signal that indicates whether device 104 is in a low power mode. In at least one example embodiment, controller 102 receives the signal that indicates whether device 104 is in a low power mode. A low power mode may relate to an operating mode of device 104 that is characterized by a reduction in power in relation to a normal power mode. For example, low power mode may relate to a power state of device 104 that is associated with less than full operation. In such an example, a low power mode may relate to a power state above S0, above C0, and/or the like. In another example, a low power mode may relate to a mode where activity of device 104 is reduced such that power consumed by device 104 is reduced. In at least one example embodiment, the signal is a logic signal that is received as an electrical signal. For example, the signal may be provided from an electrical output of device 104, and may be received by controller 102 as an electrical input. Controller 102 may continuously receive the signal.

It should be understood that as device 104 performs more activities, device 104 may increase its temperature. Therefore, as device 104 performs more operations, device 104 may increase the desirability for thermal remediation. Conversely, there may be an operating condition of device 104 that is associated with performing few enough activity such that the activity does not cause increase in temperature of device 104. For example, device 104 may be performing operations such that the amount of heat associated with such operation is less than or equal to the amount of heat dissipated by the device absent thermal remediation. This operating condition may be referred to as a thermally benign state. In at least one example embodiment, a thermally benign state is associated with a state of a device where the device is not performing actions to an extent that may cause increase in temperature. In at least one example embodiment, a low power mode is a thermally benign state.

It may be desirable to reduce power consumption associated with thermal remediation of a device, such as device 104, when the device is operating in a thermally benign state. For example, when the device is operating in a thermally benign state, the device may adequately cool without assistance of a cooling device, such as cooling device 108. In another example, when the device is in a thermally benign state, there may not be a need to monitor temperature as frequently, or at all, due to the lack of temperature increasing activity. Power consumption associated with thermal remediation that omits consideration of low power mode of a device and/or omits consideration of a thermally benign state of the device may be referred to as standard thermal remediation power consumption. For example, standard thermal remediation power consumption may relate to standard cooling device operation and standard thermal sensor sampling frequency.

FIG. 2 is a timing diagram illustrating a signal 200 that indicates whether at least one device is in a low power mode according to at least one example embodiment. The example of FIG. 2 is merely an example of a signal that indicates whether at least one device is in a low power mode, and does not limit the scope of the claims. For example, signal level associated with low power mode may vary, number of signals indicating low power mode may vary, granularity of low power mode represented by the signal may vary, and/or the like.

In at least one example embodiment, a signal may indicate low power mode by being in an asserted state. Under such circumstances, a device, such as device 104 of FIG. 1, may provide a signal that is asserted to indicate that the device may be in a low power mode and that is non-asserted to indicate that the device may be in a mode other than a low power mode. Even though the example of FIG. 2 is described in regards to a signal where a high level is associated with assertion, and a low level is associated with non-assertion, other examples may differ in this regard.

In the example of FIG. 2, signal 200 comprises non-asserted signal parts 202, 206, 210, 214, and 218. Signal 200 further comprises asserted signal parts 204, 208, 212, and 216. In at least one example embodiment, asserted signal parts 204, 208, 212, and 216 indicate that a device is in a low power mode, and non-asserted signal parts 202, 206, 210, 214, and 218 indicate that the device is in a mode that is not a low power mode. In at least one example embodiment, signal 200 is a continuous signal that is provided throughout the operation of the associated device. In at least one example embodiment, a controller may determine that asserted signal parts correspond to a thermally benign state of the device or devices from which signal 200 was received.

Figure 3:
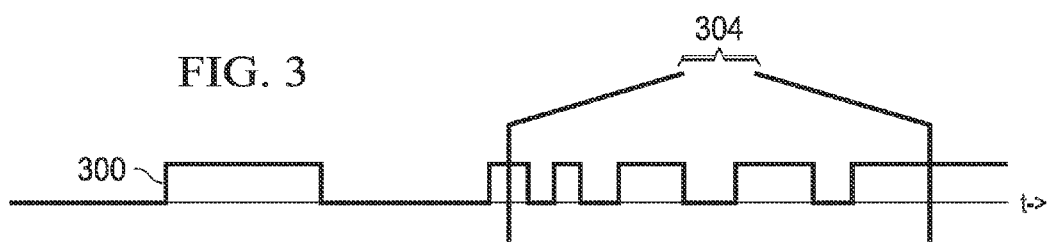
FIG. 3 is another timing diagram illustrating a signal that indicates whether at least one device is in a low power mode according to at least one example embodiment.

FIG. 3 is another timing diagram illustrating a signal that indicates whether at least one device is in a low power mode according to at least one example embodiment. The example of FIG. 3 is merely an example of a signal that indicates whether at least one device is in a low power mode, and does not limit the scope of the claims. For example, signal level associated with low power mode may vary, number of signals indicating low power mode may vary, granularity of low power mode represented by the signal may vary, and/or the like. Even though the example of FIG. 3 is described in regards to a signal where a high level is associated with assertion, and a low level is associated with non-assertion, other examples may differ in this regard.

In at least one example embodiment, it may be desirable to evaluate a signal indicating low power mode with respect to time. For example, a device, such as device 104 of FIG. 1, may enter and exit low power mode frequently, rapidly, and/or the like. In some circumstances, the thermal state of the device may not immediately change upon entry into a low power mode. Under such circumstances, it may be desirable to characterize the low power mode with regard to time. For example, it may be desirable to characterize the low power mode of a device as the percentage of time that a signal indicates low power mode over an interval of time. Such percentage may be referred to as a duty cycle. Without limiting the claims in any way, at least one technical advantage associated with evaluating the signal indicating low power mode with respect to time is to allow a controller to reduce the number of times that changes are made in thermal remediation based on the signal.

Furthermore, it should be understood that the operations associated with changing thermal remediation may correspond with power consumption. Therefore, it may be desirable to avoid changing thermal remediation with such frequency that power consumption is increased.

The example of FIG. 3 illustrates signal 300 in relation to a time interval 304. In at least one example embodiment, a controller, such as controller 102 of FIG. 1, may evaluate signal 300 with respect to time interval 304. Time interval 304 may be based on a time associated with beneficial change in thermal remediation. For example a time associated with beneficial change in thermal remediation may relate to a time that is long enough such that modifying thermal remediation at each time interval would be associated with power consumption less than or equal to power consumption associated thermal remediation that corresponds to a mode other than a low power mode. In the example of FIG. 3, signal 300 is asserted and non-asserted at various times within time interval 304. In the example of FIG. 3, signal 300 is asserted approximately 55% of the time during time interval 304. This assertion may relate to a duty cycle of 55%. In at least one example embodiment, duration of assertion may be measured by recording the amount of time between a transition to an asserted state and a transition to a non-asserted state, for example using signal edge detection.

Figure 4:
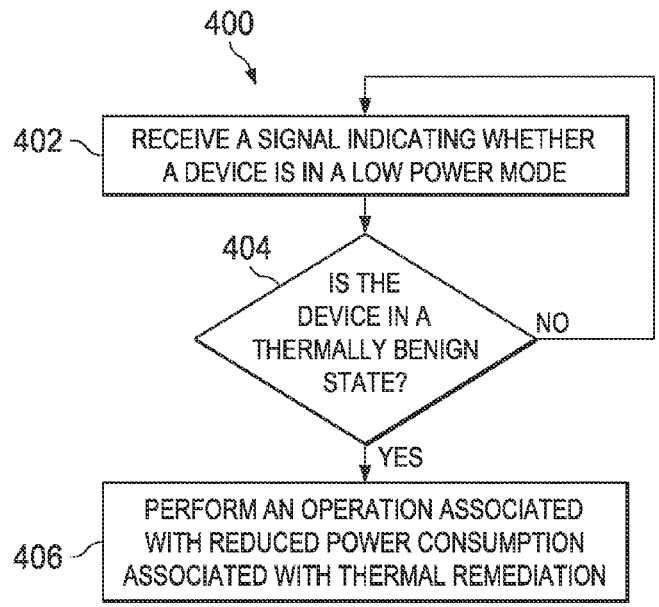
FIG. 4 is a flow diagram showing a set of operations for causing reduced thermal remediation power consumption according to at least one example embodiment.
Figure 10:
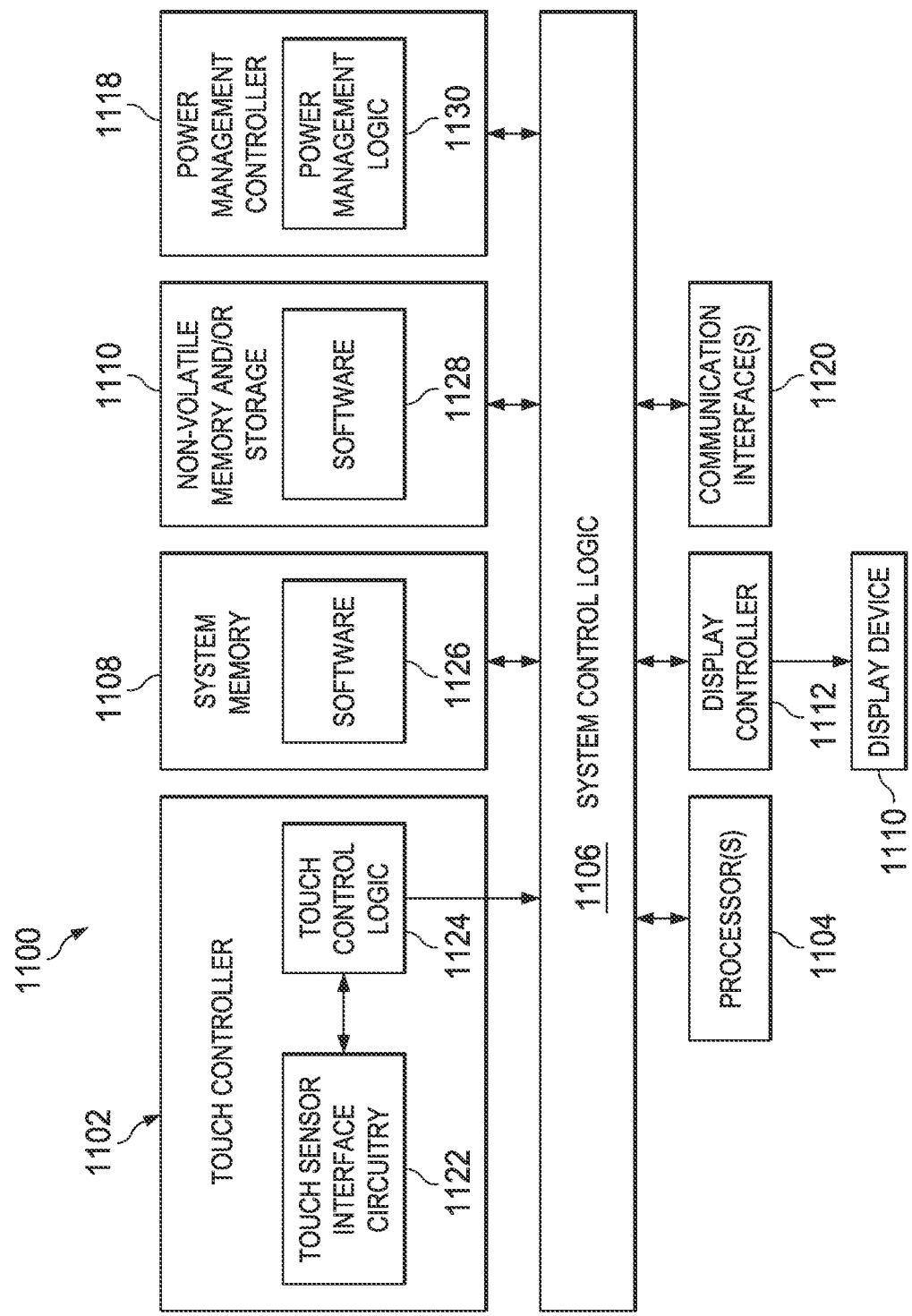
FIG. 10 is a simplified block diagram illustrating example logic that may be used to execute activities associated with the present disclosure.

FIG. 4 is a flow diagram showing a set of operations 400 for causing reduced thermal remediation power consumption according to at least one example embodiment. An apparatus, for example system 1100 of FIG. 10 or a portion thereof, may utilize the set of operations 400. The apparatus may comprise means, including, for example processor 1104 of FIG. 10, for performing the operations of FIG. 4. In an example embodiment, an apparatus, for example system 1100 of FIG. 10, is transformed by having memory, for example system memory 1108 of FIG. 10, comprising computer code configured to, working with a processor, for example processor 1104 of FIG. 10, cause the apparatus to perform set of operations 400. In at least one example embodiment, set of operations 400 are performed exclusive from operating system software.

At block 402, the apparatus receives a signal indicating whether at least one device is in a low power mode. The receiving may be similar as described regarding FIG. 1. The signal may be similar as described regarding FIGS. 1-3. At block 404, the apparatus determines whether the at least one device is in a thermally benign state based, at least in part, on the signal. The thermally benign state may be similar as described regarding FIG. 1. Determining whether the device is in a thermally benign state may comprise evaluating the signal with respect to a predefined criteria associated with thermally benign operation of the device. For example, a device may have a particular low power mode duty cycle, above which the device is in a thermally benign state. In such an example, the apparatus may determine that the device is in a thermally benign state by determining that the low power mode duty cycle of the signal exceeds a threshold duty cycle value. Such threshold duty cycle value may correspond to the particular low power mode duty cycle, above which the device is in a thermally benign state. This threshold may differ across different devices. Such threshold may be determined by design characteristics of the device, manufacturing characteristics of the device, testing of the device, and/or the like. If, at block 404, the apparatus determines that the at least one device is in a thermally benign state, flow proceeds to block 406. Otherwise, flow returns to block 402.

At block 406, the apparatus performs an operation associated with causing reduced thermal remediation power consumption. In at least one example embodiment, reduced power consumption relates to power consumption less than standard thermal remediation power consumption, similar as described regarding FIG. 1. The operation may relate to an operation associated with control of a device associated with thermal remediation. A device associated with thermal remediation may be a thermal sensor, such as thermal sensor 106 of FIG. 1, a cooling device, such as cooling device 108 of FIG. 1, and/or the like. The operation may relate to causing reduced operation associated with a software module associated with monitoring thermal sensor information. The operation may be associated with a thermal sensor. For example, the operation may relate to reducing sampling frequency associated with a thermal sensor, eliminating sampling associated with a thermal sensor, reducing power to a thermal sensor, eliminating power to a thermal sensor, and/or the like. The operation may be associated with a cooling device. For example, the operation may relate to reducing the amount of cooling performed by the cooling device, reducing power provided to the cooling device, eliminating cooling performed by the cooling device, eliminating power provided to the cooling device, and/or the like. In at least one example embodiment, the thermal remediation is associated with the device of which the signal indicated a low power mode, at block 402, similar as described regarding FIG. 1. In at least one example embodiment, the apparatus may perform the operation of block 406 in response to determination that the at least one device is in a thermally benign state.

Figure 5:
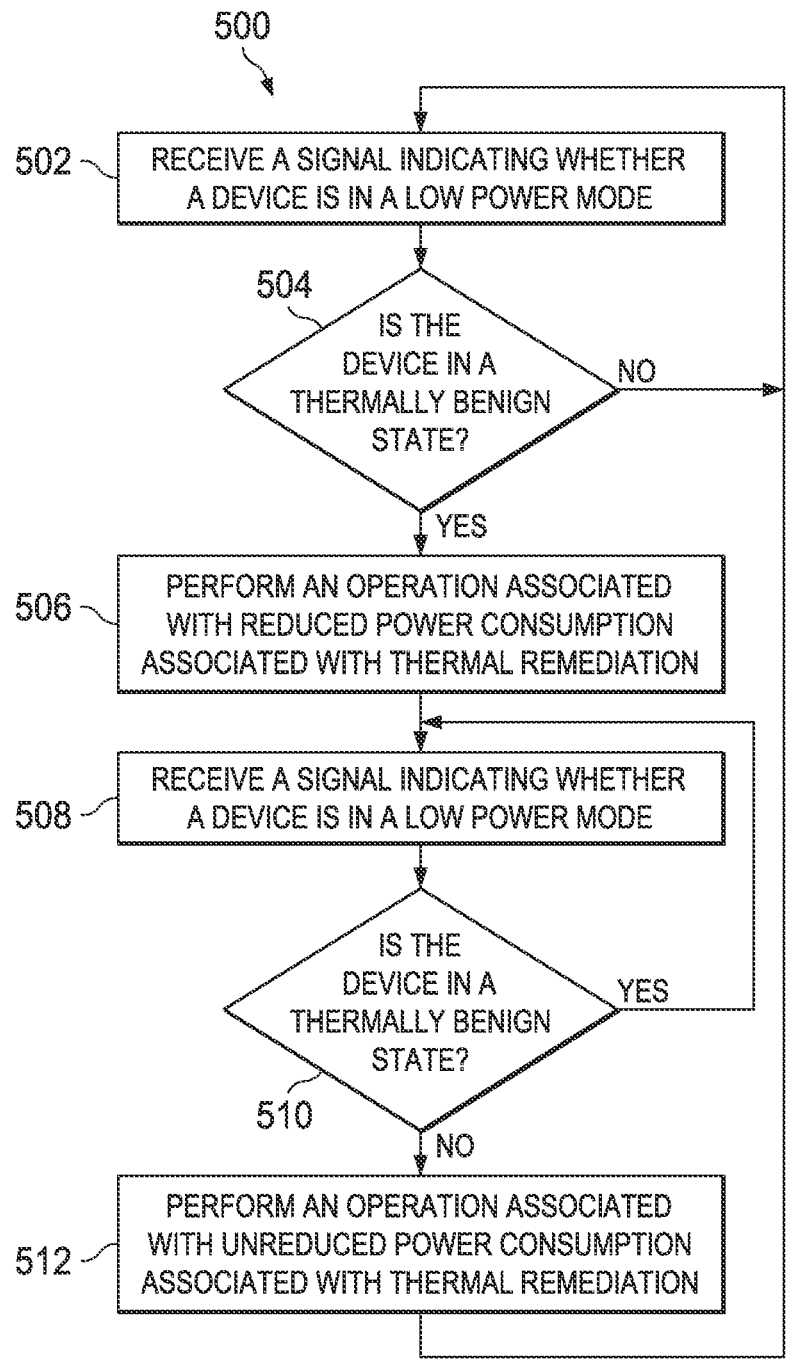
FIG. 5 is another flow diagram showing a set of operations for causing reduced thermal remediation power consumption according to at least one example embodiment.

FIG. 5 is another flow diagram showing a set of operations for causing reduced thermal remediation power consumption according to at least one example embodiment. An apparatus, for example system 1100 of FIG. 10 or a portion thereof, may utilize the set of operations 500. The apparatus may comprise means, including, for example processor 1104 of FIG. 10, for performing the operations of FIG. 5. In an example embodiment, an apparatus, for example system 1100 of FIG. 10, is transformed by having memory, for example system memory 1108 of FIG. 10, comprising computer code configured to, working with a processor, for example processor 1104 of FIG. 10, cause the apparatus to perform set of operations 500. In at least one example embodiment, set of operations 500 are performed exclusive from operating system software.

The example of FIG. 5 illustrates an example of performing an operation associated with a reduced thermal remediation power consumption under circumstances where the device is in a thermally benign state, and performing an operation associated with unreduced power consumption under circumstances where the device not in a thermally benign state. In at least one example embodiment, unreduced thermal remediation power consumption corresponds to standard thermal remediation power consumption. An operation associated with standard power consumption may relate to a thermal sensor and/or a cooling device. An operation associated with standard power consumption relating to a thermal sensor may be an operation that causes enabling of sampling associated with a thermal sensor, causes increasing sampling frequency associated with a thermal sensor, causes enabling powering of a thermal sensor, and/or the like. An operation associated with standard power consumption relating to a cooling device may be an operation that causes increase in the amount of cooling performed, increase in power provided to the cooling device, enabling of cooling by the cooling device, enabling power to be provided to the cooling device, and/or the like.

At block 502, the apparatus receives a signal indicating whether at least one device is in a low power mode similar as described regarding block 402 of FIG. 4. At block 504, the apparatus determines whether the at least one device is in a thermally benign state based, at least in part, on the signal similar as described regarding block 404 of FIG. 4. If, at block 504, the apparatus determines that the at least one device is in a thermally benign state, flow proceeds to block 506. Otherwise, flow returns to block 502. At block 506, the apparatus performs an operation associated with causing reduced thermal remediation power consumption similar as described regarding block 406 of FIG. 4.

At block 508, the apparatus receives a signal indicating whether at least one device is in a low power mode similar as described regarding block 502. At block 510, the apparatus determines whether the at least one device is in a thermally benign state based, at least in part, on the signal similar as described regarding block 504. If at block 510, the apparatus determines that the at least one device is in a thermally benign state, flow returns to block 508. Otherwise, flow proceeds to block 512. At block 512, the apparatus performs an operation associated with unreduced thermal remediation power consumption.

Figure 6:
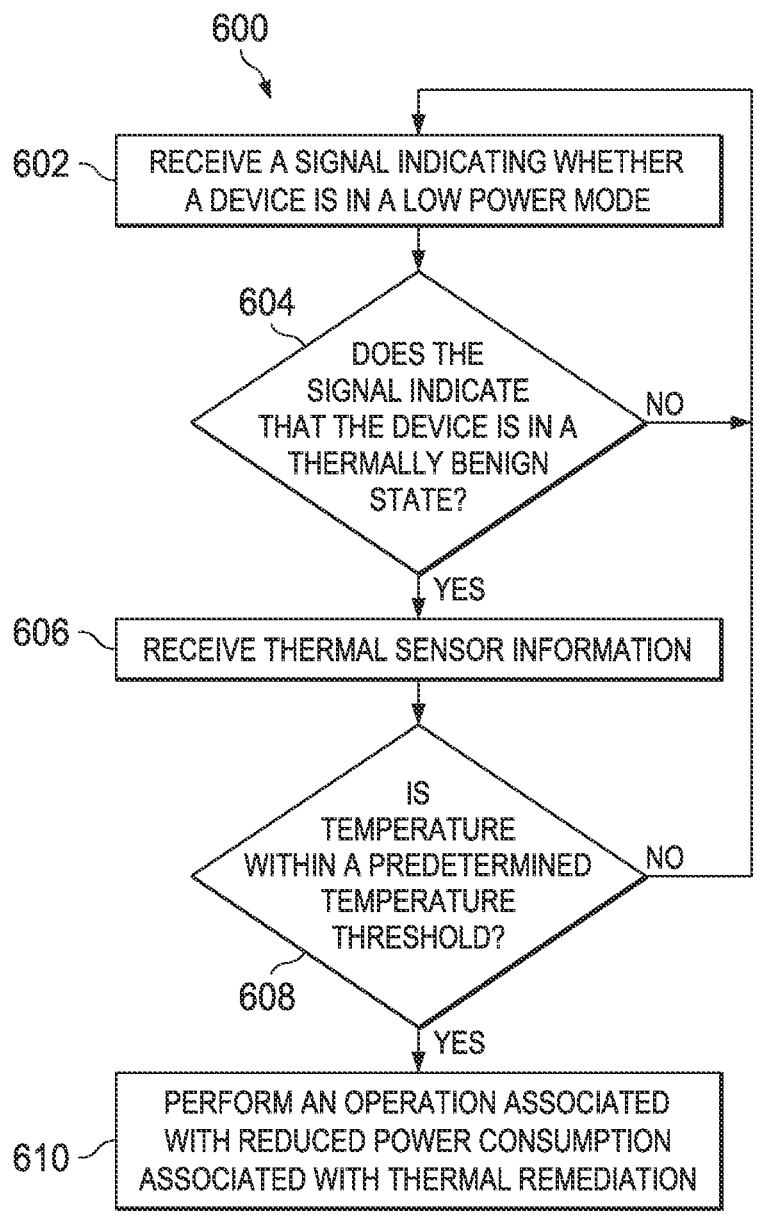
FIG. 6 is still another flow diagram showing a set of operations for causing reduced thermal remediation power consumption according to at least one example embodiment.

FIG. 6 is still another flow diagram showing a set of operations 600 for causing reduced thermal remediation power consumption according to at least one example embodiment. An apparatus, for example system 1100 of FIG. 10 or a portion thereof, may utilize the set of operations 600. The apparatus may comprise means, including, for example processor 1104 of FIG. 10, for performing the operations of FIG. 6. In an example embodiment, an apparatus, for example system 1100 of FIG. 10, is transformed by having memory, for example system memory 1108 of FIG. 10, comprising computer code configured to, working with a processor, for example processor 1104 of FIG. 10, cause the apparatus to perform set of operations 600. In at least one example embodiment, set of operations 600 are performed exclusive from operating system software.

In some circumstances, it may be desirable to perform the operation associated with a reduced thermal remediation power consumption after determining whether thermal information associated with the device is within a predetermined threshold. For example, if a device is at a high temperature, it may be beneficial to continue cooling the device, even after the device enters a thermally benign state so that the device may reach a lower temperature before thermal remediation may be reduced. Without limiting the claims in any way, at least one technical advantage of basing performance of the operation further on the thermal sensor information indicating a temperature within a predefined threshold may be to allow the device to reach a lower temperature before thermal remediation may be reduced.

At block 602, the apparatus receives a signal indicating whether at least one device is in a low power mode similar as described regarding block 402 of FIG. 4. At block 604, the apparatus determines whether the at least one device is in a thermally benign state based, at least in part, on the signal similar as described regarding block 404 of FIG. 4. If, at block 604, the apparatus determines that the at least one device is in a thermally benign state, flow proceeds to block 606. Otherwise, flow returns to block 602. At block 606, the apparatus receives thermal sensor information, similar as described regarding FIG. 1. At block 608, the apparatus determines whether the thermal sensor information indicates a temperature within a predetermined temperature threshold. If, at block 608, the apparatus determines that the temperature exceeds a predetermined temperature threshold, flow returns to block 602. Otherwise, flow proceeds to block 610. Therefore, the apparatus may perform the operation of block 610 in response to determination that the at least one device is in a thermally benign state, and in further response to determination that the thermal sensor information indicates a temperature within a predetermined temperature threshold. At block 610, the apparatus performs an operation associated with causing reduced thermal remediation power consumption similar as described regarding block 406 of FIG. 4.

Figure 7:
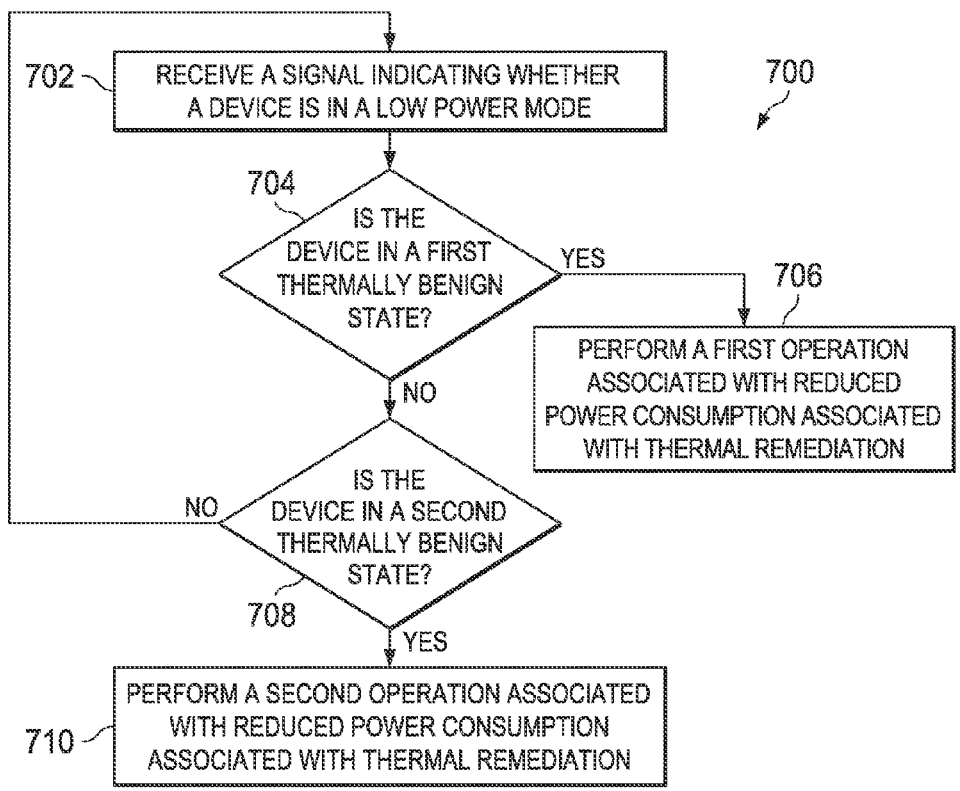
FIG. 7 is yet another flow diagram showing a set of operations for causing reduced thermal remediation power consumption according to at least one example embodiment.

FIG. 7 is yet another flow diagram showing a set of operations 700 for causing reduced thermal remediation power consumption according to at least one example embodiment. An apparatus, for example system 1100 of FIG. 10 or a portion thereof, may utilize the set of operations 700. The apparatus may comprise means, including, for example processor 1104 of FIG. 10, for performing the operations of FIG. 7. In an example embodiment, an apparatus, for example system 1100 of FIG. 10, is transformed by having memory, for example system memory 1108 of FIG. 10, comprising computer code configured to, working with a processor, for example processor 1104 of FIG. 10, cause the apparatus to perform set of operations 700. In at least one example embodiment, set of operations 700 are performed exclusive from operating system software.

In at least one example embodiment, there may be more than one level of granularity associated with a thermally benign state. For example, there may be one thermally benign state that is associated with less heat generation than a different thermally benign state. For example, there may be multiple levels of thermally benign states, each being associated with a different level of heat generation. Under such circumstances, it may be desirable to base the operation performed in response to determination of the thermally benign state on the level of heat generation associated with the thermally benign state. For example, when a device is in a second thermally benign state associated with less heat generation than a first thermally benign state, it may be desirable to perform a second operation associated with greater reduced thermal remediation power consumption than the power consumption associated with thermal remediation associated with the first operation.

At block 702, the apparatus receives a signal indicating whether at least one device is in a low power mode similar as described regarding block 402 of FIG. 4. At block 704, the apparatus determines whether the at least one device is in a first thermally benign state based, at least in part, on the signal, similar as described regarding block 404 of FIG. 4. If, at block 704, the apparatus determines that the at least one device is in a first thermally benign state, flow proceeds to block 706. Otherwise, flow proceeds to block 708. At block 706, the apparatus performs an operation associated with causing reduced thermal remediation power consumption similar as described regarding block 406 of FIG. 4. If, at block 704, the apparatus determined that the at least one device is not in a first thermally benign state, at block 708, the apparatus determines whether the at least one device is in a second thermally benign state, similar as described regarding block 404 of FIG. 4. In at least one example embodiment, the second thermally benign state is associated with less heat generation than the first thermally benign state. If, at block 708, the apparatus determines that the at least one device is in a second thermally benign state, flow proceed to block 710. Otherwise, flow returns to block 702. At block 710, the apparatus performs a second operation associated with causing reduced thermal remediation power consumption. In at least one example embodiment, the second operation is associated with causing greater reduction of power consumption associated with thermal remediation than the reduction of power consumption associated with the first operation.

Figure 8:
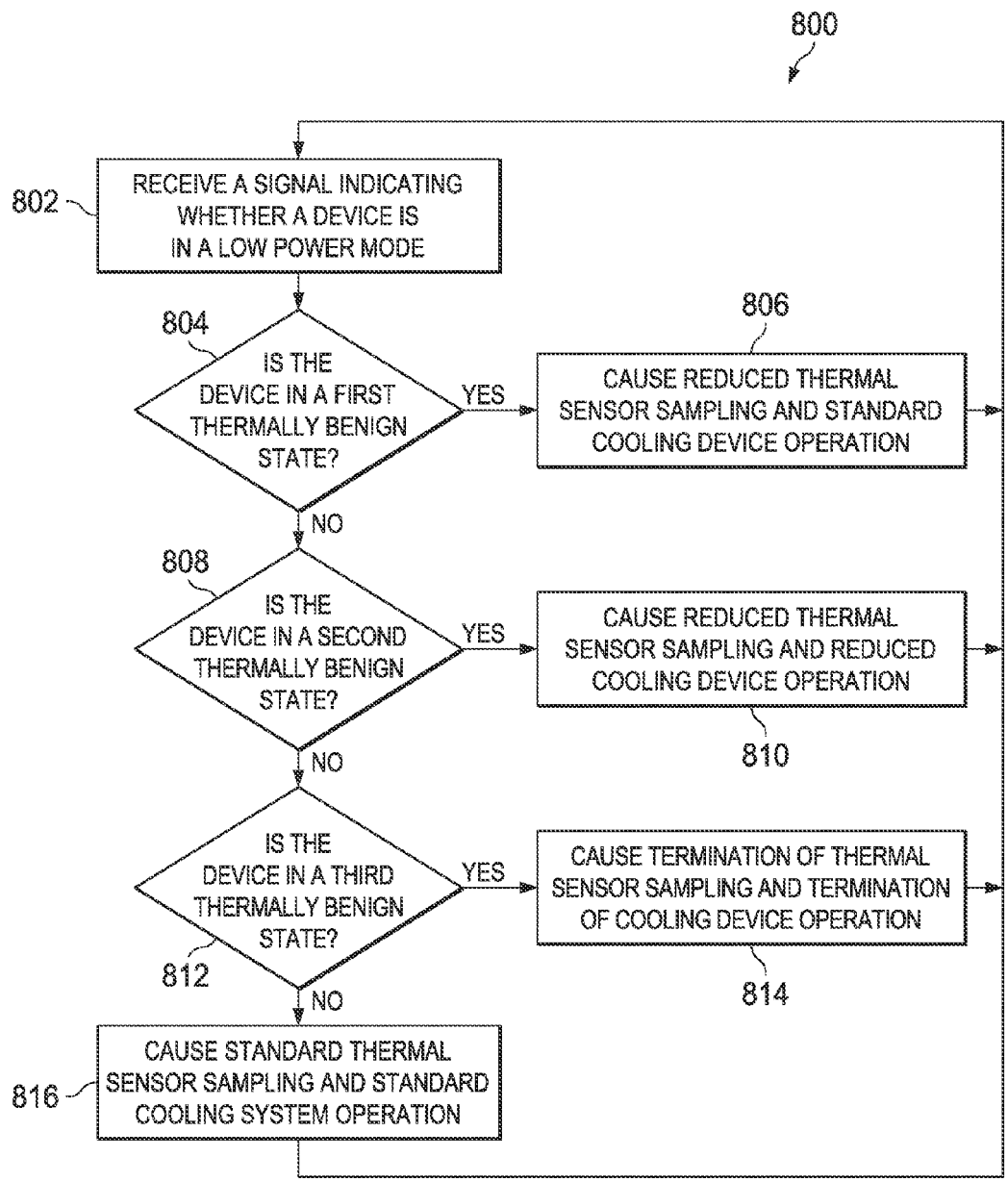
FIG. 8 is still yet another flow diagram showing a set of operations for causing reduced thermal remediation power consumption according to at least one example embodiment.

FIG. 8 is still yet another flow diagram showing a set of operations 800 for causing reduced thermal remediation power consumption according to at least one example embodiment. An apparatus, for example system 1100 of FIG. 10 or a portion thereof, may utilize the set of operations 800. The apparatus may comprise means, including, for example processor 1104 of FIG. 10, for performing the operations of FIG. 8. In an example embodiment, an apparatus, for example system 1100 of FIG. 10, is transformed by having memory, for example system memory 1108 of FIG. 10, comprising computer code configured to, working with a processor, for example processor 1104 of FIG. 10, cause the apparatus to perform set of operations 800. In at least one example embodiment, set of operations 800 are performed exclusive from operating system software.

At block 802, the apparatus receives a signal indicating whether at least one device is in a low power mode similar as described regarding block 402 of FIG. 4. At block 804, the apparatus determines whether the at least one device is in a first thermally benign state based, at least in part, on the signal, similar as described regarding block 404 of FIG. 4. If, at block 804, the apparatus determines that the at least one device is in a first thermally benign state, flow proceeds to block 806. Otherwise, flow proceeds to block 808. At block 806, the apparatus performs an operation associated with causing reduced thermal sensor sampling frequency and standard cooling device operation, similar as described regarding FIGS. 1 and 4. If, at block 804, the apparatus determined that the at least one device is not in a first thermally benign state, at block 808, the apparatus determines whether the at least one device is in a second thermally benign state, similar as described regarding block 404 of FIG. 4. In at least one example embodiment, the second thermally benign state is associated with less heat generation than the first thermally benign state. If, at block 808, the apparatus determines that the at least one device is in a second thermally benign state, flow proceeds to block 810. Otherwise, flow proceeds to block 812. At block 810, the apparatus performs an operation associated with causing reduced thermal sensor sampling frequency and reduced cooling device operation.

If, at block 808, the apparatus determined that the at least one device is not in a second thermally benign state, at block 812, the apparatus determines whether the at least one device is in a third thermally benign state, similar as described regarding block 404 of FIG. 4. In at least one example embodiment, the third thermally benign state is associated with less heat generation than the second thermally benign state. If, at block 812, the apparatus determines that the at least one device is in a third thermally benign state, flow proceeds to block 814. Otherwise, flow proceeds to block 816. At block 814, the apparatus performs an operation associated with causing termination of thermal sensor sampling and termination of cooling device operation. If, at block 812, the apparatus determined that the at least one device is not in a third thermally benign state, at block 816, the apparatus performs and operation associated with causing standard thermal sensor sampling and standard cooling system operation.

Figure 9:
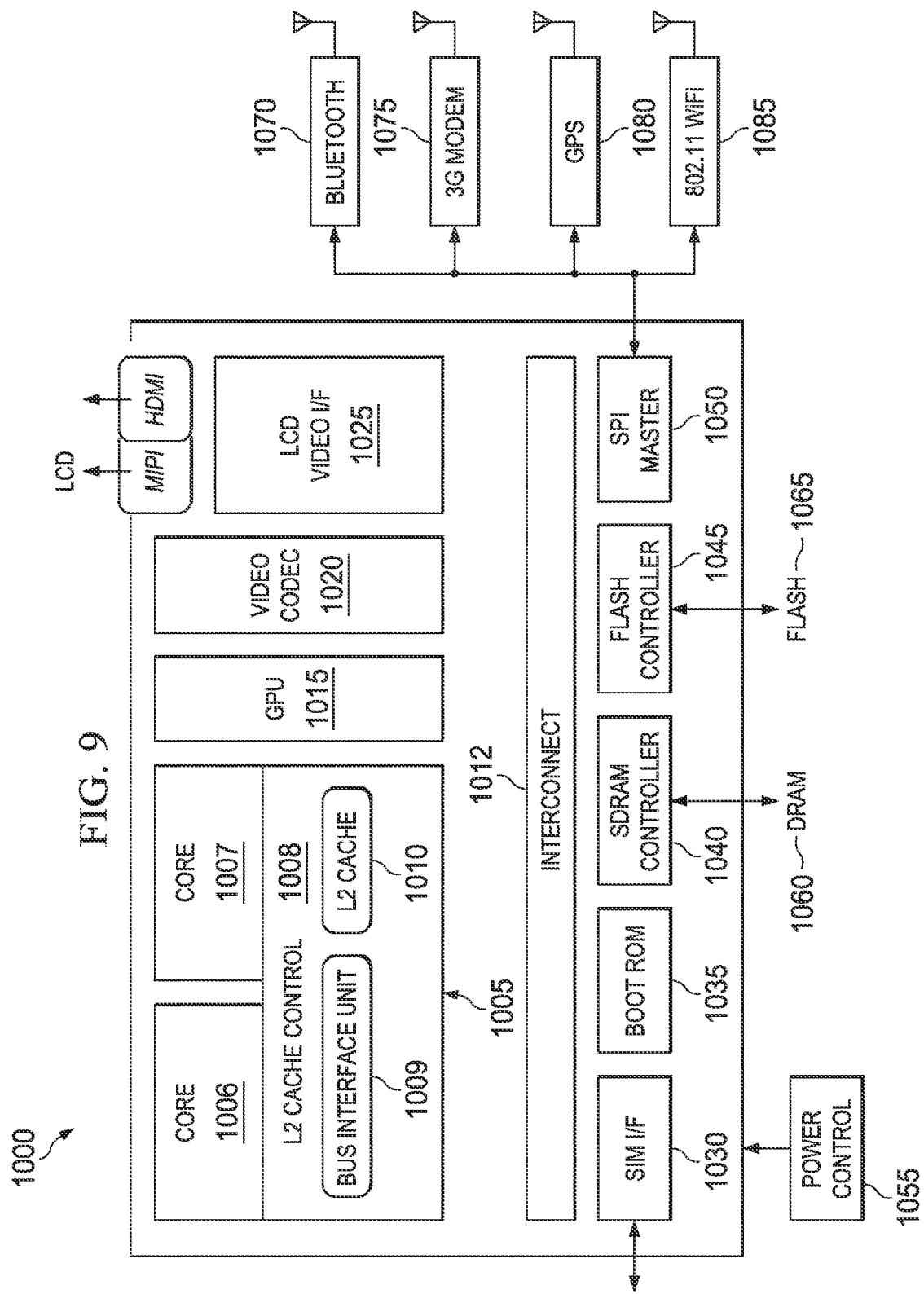
FIG. 9 is a simplified block diagram associated with an example ARM ecosystem system on chip (SOC) of the present disclosure.

FIG. 9 is a simplified block diagram associated with an example ARM ecosystem SOC 1000 of the present disclosure. At least one example implementation of the present disclosure includes an integration of the power savings features discussed herein and an ARM component. For example, the example of FIG. 9 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surfacer™, personal computer, server, video processing components, laptop computer (inclusive of any type of notebook), any type of touch-enabled input device, etc.

In this example of FIG. 9, ARM ecosystem SOC 1000 may include multiple cores 1006-1007, an L2 cache control 1008, a bus interface unit 1009, an L2 cache 1010, a graphics processing unit (GPU) 1015, an interconnect 1012, a video codec 1020, and a liquid crystal display (LCD) I/F 1025, which may be associated with mobile industry processor interface (MIPI)/high-definition multimedia interface (HDMI) links that couple to an LDC.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiment include one or more communication capabilities, interfaces, and features such as instances of Bluetooth 1070, a 3G modem 1075, a global positioning system (GPS) 1080, and an 802.11 WiFi 1085.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

FIG. 10 is a simplified block diagram illustrating potential electronics and logic that may be associated with any of the power saving operations discussed herein. In at least one example embodiment, system 1100 includes a touch controller 1102, one or more processors 1104, system control logic 1106 coupled to at least one of processor(s) 1104, system memory 1108 coupled to system control logic 1106, non-volatile memory and/or storage device(s) 1110 coupled to system control logic 1106, display controller 1112 coupled to system control logic 1106, display controller 1112 coupled to a display, power management controller 1118 coupled to system control logic 1106, and/or communication interfaces 1120 coupled to system control logic 1106.

System control logic 1106, in at least one embodiment, includes any suitable interface controllers to provide for any suitable interface to at least one processor 1104 and/or to any suitable device or component in communication with system control logic 1106. System control logic 1106, in at least one example embodiment, includes one or more memory controllers to provide an interface to system memory 1108. System memory 1108 may be used to load and store data and/or instructions, for example, for system 1100. System memory 1108, in at least one example embodiment, includes any suitable volatile memory, such as suitable dynamic random access memory (DRAM) for example. System control logic 1106, in at least one example embodiment, includes one or more input/output (I/O) controllers to provide an interface to a display device, touch controller 1102, and non-volatile memory and/or storage device(s) 1110.

Non-volatile memory and/or storage device(s) 1110 may be used to store data and/or instructions, for example within software 1128. Non-volatile memory and/or storage device(s) 1110 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1118 may include power management logic 1130 configured to control various power management and/or power saving functions disclosed herein or any part thereof. In at least one example embodiment, power management controller 1118 is configured to reduce the power consumption of components or devices of system 1100 that may either be operated at reduced power or turned off when the electronic device is in the closed configuration. For example, in at least one example embodiment, when the electronic device is in a closed configuration, power management controller 1118 performs one or more of the following: power down the unused portion of the display and/or any backlight associated therewith; allow one or more of processor(s) 1104 to go to a lower power state if less computing power is required in the closed configuration; and shutdown any devices and/or components, such as keyboard 108, that are unused when an electronic device is in the closed configuration.

Communications interface(s) 1120 may provide an interface for system 1100 to communicate over one or more networks and/or with any other suitable device. Communications interface(s) 1120 may include any suitable hardware and/or firmware. Communications interface(s) 1120, in at least one example embodiment, may include, for example, a network adapter, a wireless network adapter, a telephone modem, and/or a wireless modem.

System control logic 1106, in at least one example embodiment, includes one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 1104 may be packaged together with logic for one or more controllers of system control logic 1106. In at least one example embodiment, at least one processor 1104 may be packaged together with logic for one or more controllers of system control logic 1106 to form a System in Package (SiP). In at least one example embodiment, at least one processor 1104 may be integrated on the same die with logic for one or more controllers of system control logic 1106. For at least one example embodiment, at least one processor 1104 may be integrated on the same die with logic for one or more controllers of system control logic 1106 to form a System on Chip (SoC).

For touch control, touch controller 1102 may include touch sensor interface circuitry 1122 and touch control logic 1124. Touch sensor interface circuitry 1122 may be coupled to detect touch input over a first touch surface layer and a second touch surface layer of display 11 (i.e., display device 1110). Touch sensor interface circuitry 1122 may include any suitable circuitry that may depend, for example, at least in part on the touch-sensitive technology used for a touch input device. Touch sensor interface circuitry 1122, in one embodiment, may support any suitable multi-touch technology. Touch sensor interface circuitry 1122, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 1124 may be coupled to help control touch sensor interface circuitry 1122 in any suitable manner to detect touch input over a first touch surface layer and a second touch surface layer. Touch control logic 1124 for at least one example embodiment may also be coupled to output in any suitable manner digital touch input data corresponding to touch input detected by touch sensor interface circuitry 1122. Touch control logic 1124 may be implemented using any suitable logic, including any suitable hardware, firmware, and/or software logic (e.g., non-transitory tangible media), that may depend, for example, at least in part on the circuitry used for touch sensor interface circuitry 1122. Touch control logic 1124 for one embodiment may support any suitable multi-touch technology.

Touch control logic 1124 may be coupled to output digital touch input data to system control logic 1106 and/or at least one processor 1104 for processing. At least one processor 1104 for one embodiment may execute any suitable software to process digital touch input data output from touch control logic 1124. Suitable software may include, for example, any suitable driver software and/or any suitable application software. As illustrated in FIG. 11, system memory 1108 may store suitable software 1126 and/or non-volatile memory and/or storage device(s).

Note that in some example implementations, the power management functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the circuits discussed herein. Some of these blocks may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

Example Embodiment Implementations

At least one particular example implementation may include an apparatus that includes a means for receiving a signal (e.g., over any suitable interface, link, bus, communication pathway, etc.). The signal can indicate whether at least one device is in a low power mode. The apparatus many also include a means for determining (e.g., via a processor, software, circuitry, a hub, a controller, etc.) that the at least one device is in a first thermally benign state based, at least in part, on the signal, and a means for performing (e.g., via a processor, software, circuitry, a hub, a controller, etc.) a first operation associated with a reduced thermal remediation power consumption.

What is claimed is:

1. A method to reduce power consumption of a device, the method comprising:
receiving, at a processor of the device, a signal indicative of whether a power state of the device is a power state having lower power consumption than a level 0 power state;
determining, by the processor, that the device is in a first thermally benign state based, at least in part, on the signal;
causing, by the processor at least in part in response to the determination that the device is in the first thermally benign state, the performance of a first operation of a thermal remediation system, wherein the first operation is to result in a reduction in power consumption of the thermal remediation system;
determining that the device is in a second thermally benign state based, at least in part, on the signal, wherein the second thermally benign state is associated with less heat generation than the first thermally benign state;
causing, by the processor at least in part in response to the determination that the device is in the second thermally benign state, the performance of a second operation of the thermal remediation system, wherein the second operation is associated with causing greater reduction of power consumption associated with thermal remediation than the reduction of power consumption associated with the first operation;
determining that the device is in a third thermally benign state based, at least in part, on the signal, wherein the third thermally benign state is associated with less heat generation than the second thermally benign state; and
causing, at least in part in response to the determination that the device is in the third thermally benign state, reduction of power consumption associated with a cooling device;
wherein the first operation relates to reducing a sampling frequency associated with a thermal sensor, and wherein the second operation relates to disabling a thermal sensor.

2. The method of claim 1, wherein the device comprises a controller hub.

3. The method of claim 1, wherein determining that the device is in a first thermally benign state comprises determining that a low power duty cycle of the signal exceeds a threshold duty cycle.

4. The method of claim 1, wherein the first operation relates to reducing power consumption associated with a software module associated with monitoring thermal sensor information, a thermal sensor, or a cooling device.

5. The method of claim 1, further comprising:
receiving thermal sensor information; and
determining that the thermal sensor information indicates a temperature within a predetermined temperature threshold.

6. An apparatus to reduce power consumption comprising:
logic, the logic at least partially including hardware logic, to:
receive a signal indicative of whether a power state of a device is a power state having lower power consumption than a level 0 power state;
determine that the device is in a first thermally benign state based, at least in part, on the signal;
cause, at least in part in response to the determination that the device is in the first thermally benign state, performance of a first operation of a thermal remediation system, wherein the first operation is associated with a reduction of power consumption of the thermal remediation system;
determine that the device is in a second thermally benign state based, at least in part, on the signal, wherein the second thermally benign state is associated with less heat generation than the first thermally benign state;
cause, at least in part in response to the determination that the device is in the second thermally benign state, performance of a second operation of the thermal remediation system, wherein the second operation is associated with causing greater reduction of power consumption associated with thermal remediation than the reduction of power consumption associated with the first operation;
determine that the device is in a third thermally benign state based, at least in part, on the signal, wherein the third thermally benign state is associated with less heat generation than the second thermally benign state; and
cause, at least in part in response to the determination that the device is in the third thermally benign state, reduction of power consumption associated with a cooling device;
wherein the first operation relates to reduction of a sampling frequency associated with a thermal sensor, and wherein the second operation relates to disablement of a thermal sensor.

7. The apparatus of claim 6, wherein the device comprises a processor or a controller hub.

8. The apparatus of claim 6, wherein determination that the device is in a first thermally benign state comprises determination that a low power duty cycle of the signal exceeds a threshold duty cycle.

9. The apparatus of claim 6, wherein the first operation relates to reduced power consumption associated with a software module associated with monitoring of thermal sensor information, a thermal sensor, or a cooling device.

10. The apparatus of claim 6, further comprising logic, the logic at least partially including hardware logic, to:
receive thermal sensor information; and
determine that the thermal sensor information indicates a temperature within a predetermined temperature threshold.

11. A non-transitory computer readable medium to reduce power consumption, the non-transitory computer readable medium comprising computer instructions, that, when executed by at least one processor, cause an apparatus comprising the at least one processor to:
receive a signal indicative of whether a power state of a device is a power state having lower power consumption than a level 0 power state;
determine that the device is in a first thermally benign state based, at least in part, on the signal;
cause, at least in part in response to the determination that the device is in the first thermally benign state, performance of a first operation of a thermal remediation system, wherein the first operation is to result in a reduction in power consumption of the thermal remediation system;
determine that the device is in a second thermally benign state based, at least in part, on the signal, wherein the second thermally benign state is associated with less heat generation than the first thermally benign state;
cause, at least in part in response to the determination that the device is in the second thermally benign state, performance of a second operation of the thermal remediation system, wherein the second operation is associated with causing greater reduction of power consumption associated with thermal remediation than the reduction of power consumption associated with the first operation determine that the device is in a third thermally benign state based, at least in part, on the signal, wherein the third thermally benign state is associated with less heat generation than the second thermally benign state; and cause, at least in part in response to the determination that the device is in the third thermally benign state, reduction of power consumption associated with a cooling device;

wherein the first operation relates to reduction of a sampling frequency associated with a thermal sensor, and wherein the second operation relates to disablement of a thermal sensor.

12. The computer readable medium of claim 11, wherein the device comprises a processor or a controller hub.

13. The computer readable medium of claim 11, wherein determination that the device is in a first thermally benign state comprises determination that a low power duty cycle of the signal exceeds a threshold duty cycle.

14. The computer readable medium of claim 11, wherein the first operation relates to reduction of power consumption associated with a software module associated with monitoring of thermal sensor information, a thermal sensor, or a cooling device.

15. The computer readable medium of claim 11, wherein the computer readable medium further comprises computer instructions, that, when executed by the at least one processor, further cause the apparatus comprising the processor to:
receive thermal sensor information; and
determine that the thermal sensor information indicates a temperature within a predetermined temperature threshold.

16. A system to reduce power consumption comprising: at least one controller and a device, the controller comprising logic, the logic at least partially including hardware logic, to:
receive, at the controller, a signal indicative of whether a power state of a device is a power state having lower power consumption than a level 0 power state;
determine, at the controller, that the device is in a first thermally benign state based, at least in part, on the signal; and
cause, at the controller at least in part on response to the determination that the devices in the first thermally benign state, performance of a first operation of a thermal remediation system, wherein the first operation is to result in a reduction in power consumption of the thermal remediation system;
determine, at the controller, that the device is in a second thermally benign state based, at least in part, on the signal, wherein the second thermally benign state is associated with less heat generation than the first thermally benign state;
cause, at the controller at least in part in response to the determination that the device is in the second thermally benign state, performance of a second operation of the thermal remediation system, wherein the second operation is associated with causing greater reduction of power consumption associated with thermal remediation than the reduction of power consumption associated with the first operation;
determine, at the controller, that the device is in a third thermally benign state based, at least in part, on the signal, wherein the third thermally benign state is associated with less heat generation than the second thermally benign state; and
cause, at the controller at least in part in response to the determination that the device is in the third thermally benign state, reduction of power consumption associated with a cooling device.

17. The system of claim 16, wherein the device comprises at least one of a processor or a controller hub.

18. The system of claim 16, wherein determination that the device is in a first thermally benign state comprises determination that a low power duty cycle of the signal exceeds a threshold duty cycle.

19. The system of claim 16, wherein the first operation relates to reduced power consumption associated with a software module associated with monitoring of thermal sensor information, a thermal sensor, or a cooling device.

20. The system of claim 16, wherein the first operation relates to reduction of a sampling frequency associated with a thermal sensor.

21. The apparatus of claim 6, wherein the device includes a system on a chip (SOC).

22. The apparatus of claim 6, wherein the apparatus is a touch-enabled computing device.

23. The computer readable medium of claim 11, wherein the device includes a system on a chip (SOC).

24. The system of claim 16, wherein the second operation relates to disablement of a thermal sensor.

25. The system of claim 16, wherein the first operation relates to reduction of power to a thermal sensor.

26. The system of claim 16, wherein the first operation relates to reduction of power provided to a cooling device.

27. The system of claim 16, wherein the signal indicative of whether a power state of a device is a power state having lower power consumption than a level 0 power state is a logic signal.

28. The system of claim 16, wherein the device includes a system on a chip (SOC).

29. The system of claim 16, wherein the device includes a core processor implementing an out-of-order superscalar pipeline.

30. The system of claim 16, wherein the controller and the device are included in a touch-enabled computing device.

* * * * *